United States Patent
Meusling et al.

(10) Patent No.: US 9,397,765 B2
(45) Date of Patent: Jul. 19, 2016

(54) METHOD FOR THE SELF-TESTING OF A REACTIVE RADIO INTERFERER

(71) Applicant: Airbus Defence and Space GmbH, Ottobrunn (DE)

(72) Inventors: Askold Meusling, Holzkirchen (DE); Torben Brack, Blaustein (DE); Hubert Piontek, Illerkirchberg (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/387,250

(22) PCT Filed: Mar. 7, 2013

(86) PCT No.: PCT/DE2013/000124
§ 371 (c)(1),
(2) Date: Sep. 23, 2014

(87) PCT Pub. No.: WO2013/143518
PCT Pub. Date: Oct. 3, 2013

(65) Prior Publication Data
US 2015/0050895 A1 Feb. 19, 2015

(30) Foreign Application Priority Data
Mar. 24, 2012 (DE) .......................... 10 2012 006 228

(51) Int. Cl.
*H04B 17/14* (2015.01)
*H04B 17/19* (2015.01)
(Continued)

(52) U.S. Cl.
CPC ............ *H04B 17/0012* (2013.01); *H04B 17/14* (2015.01); *H04K 3/45* (2013.01); *H04K 3/94* (2013.01); *H04B 17/0085* (2013.01); *H04K 2203/34* (2013.01)

(58) Field of Classification Search
CPC ........ H04B 17/00; H04B 17/12; H04B 17/14; H04B 17/19; H04W 24/00; H04W 24/08; H03K 3/45
See application file for complete search history.

(56) References Cited

U.S. PATENT DOCUMENTS 5,640,143 A * 6/1997 Myron ................. G08B 29/185
250/DIG. 1
5,822,429 A * 10/1998 Casabona ............. G01S 19/015
342/357.4
(Continued)

FOREIGN PATENT DOCUMENTS

DE 699 35 441 T2 1/2008
DE 10 2009 006 861 A1 8/2010
(Continued)

OTHER PUBLICATIONS

International Search Report dated Aug. 21, 2013 with English translation (seven (7) pages).

*Primary Examiner* — Andrew Wendell
(74) *Attorney, Agent, or Firm* — Crowell & Moring LLP

(57) ABSTRACT

A reactive radio interferer includes a plurality of time synchronized transmitting/receiving lines, each of which is designed to alternately carry out-monitoring phases in order to receive the radio spectrum and interference phases in order to transmit an interference signal on the basis of the radio spectrum received in the monitoring phase. Testing of the reactive radio interferer is performed by having one of the transmitting/receiving lines transmit a test signal within a monitoring phase, the test signal being received and evaluated by at least one other transmitting/receiving line.

6 Claims, 2 Drawing Sheets

(51) Int. Cl.
*H04W 24/08* (2009.01)
*H04B 17/00* (2015.01)
*H04K 3/00* (2006.01)

(56) References Cited

U.S. PATENT DOCUMENTS

| | | |
|---|---|---|
| 6,505,041 B1 | 1/2003 | Borgstrand |
| 7,683,842 B1 | 3/2010 | Engel et al. |
| 2005/0041728 A1 | 2/2005 | Karlsson |
| 2006/0240790 A1 | 10/2006 | Timmis et al. |
| 2007/0116093 A1 | 5/2007 | Karlsson |
| 2009/0105978 A1* | 4/2009 | Schuttert .......... G01R 31/31725 702/69 |
| 2010/0128761 A1 | 5/2010 | Cornwell |
| 2011/0115498 A1* | 5/2011 | Kumar ................ B81C 99/0045 324/649 |
| 2013/0084852 A1* | 4/2013 | Duperray ........... H04B 17/0027 455/425 |

FOREIGN PATENT DOCUMENTS

| | | |
|---|---|---|
| DE | 10 2011 101 712 A1 | 10/2011 |
| WO | WO 00/21226 A2 | 4/2000 |

\* cited by examiner

METHOD FOR THE SELF-TESTING OF A REACTIVE RADIO INTERFERER

BACKGROUND AND SUMMARY OF THE INVENTION

Exemplary embodiments of the invention relate to a method for the self-testing of a reactive radio interferer.

Radio interferers are technical devices that are used to interfere with radio connections, especially communications connections. They are used for, inter alia, the protection of vehicles or vehicle convoys against remotely ignited bombs (RCIEDs, Remote Controlled Improvised Explosive Devices). A special type of radio interferers are reactive radio interferers. The interference takes place in the case of reactive radio interferers only if a signal to be interfered with is detected. For this purpose reactive radio interferers operate alternatingly and continuously in two different phases:

- observation phases in which the existing radio spectrum is received and analyzed,
- interference phases in which an interference signal is transmitted, and this is done based on the radio spectrum of the surroundings received in the observation phase.

German patent document DE102009006861 A1 and U.S. patent document US2005/0041728 A1 disclose such reactive interference transmitters.

In order to achieve the targeted protection, all functional elements of a reactive interference transmitter must operate properly. Therefore it is necessary to monitor all components, including the passive components such as cables and antennas.

The monitoring should be carried out as continuously as possible, so that it is noticed in time if components are not operating properly or if cable connections have loosened.

Known systems for self-testing in reactive radio interferers are based on the loop-back method for testing electronic assemblies. However, the critical areas of the antenna cabling and the antenna itself are hardly checked. Moreover, according to the prior art additional electronic assemblies for self-testing purposes are often integrated within systems or are used for the testing of external measurement means.

German patent document DE 699 35 441 T2 discloses a radio base station in which to carry out a self-test a transmitter of the base station transmits a test signal that is received and analyzed by a receiver of the base station.

Exemplary embodiments of the invention are directed to a method for the self-testing of a reactive interference transmitter that can be carried out without such assemblies within the device that are exclusively required for test purposes and with which testing also takes place without external testing means.

The method according to the invention does not require additional means, such as e.g. external measuring equipment or integrated measurement electronics, for the testing. Rather, the self-testing can be carried out exclusively with functional assemblies already present in the system and without any external tools.

The self-testing can advantageously be carried out continuously during the normal operation of the radio interferer without having to accept a significant limitation of the operating function.

Moreover, the self-testing according to the invention can also be carried out at system start, i.e. before the normal operation of the interference transmitter.

Because with the method according to the invention the complete reception and transmission paths of the reactive interference transmitter with all components including the antennas can be included in the test, a new quality of the test coverage can be achieved in such systems.

BRIEF DESCRIPTION OF THE DRAWING FIGURES

The invention is explained in detail using specific exemplary embodiments with reference to figures. In the figures.

DETAILED DESCRIPTION

Figure 1:
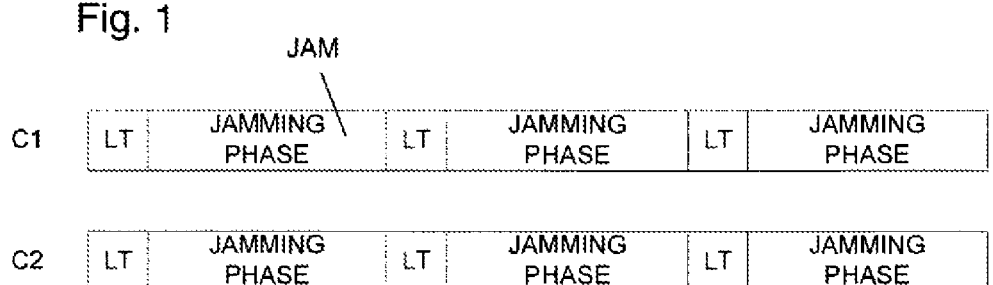
FIG. 1 shows the illustration of the operation of a reactive interference transmitter in normal operation (prior art)

FIG. 1 shows the basic operation of a reactive interference transmitter in normal operation (without a simultaneous test operation) as it is known from the prior art. The invention is based on this manner of operation and the technical design yet to be described below. Reactive radio interferers generally consist of a plurality of transmission/reception paths. In FIG. 1 by way of example two transmission/reception paths C1, C2 are taken in account. A transmission/reception path consists here of a receiver connected to an antenna, signal processing for spectral analysis, signal processing for transmission signal generation and a transmitter with a downstream power amplifier and a transmitting antenna. The system operates with changing phases of spectrum observation (look through) LT and interference JAM phases, in which an interference signal spectrum (based on the preceding spectrum observation) is transmitted (jamming). All transmission/reception paths operate here according to the same time schema, i.e. the phases LT and JAM of the individual transmission/reception paths are synchronized.

Figure 2:
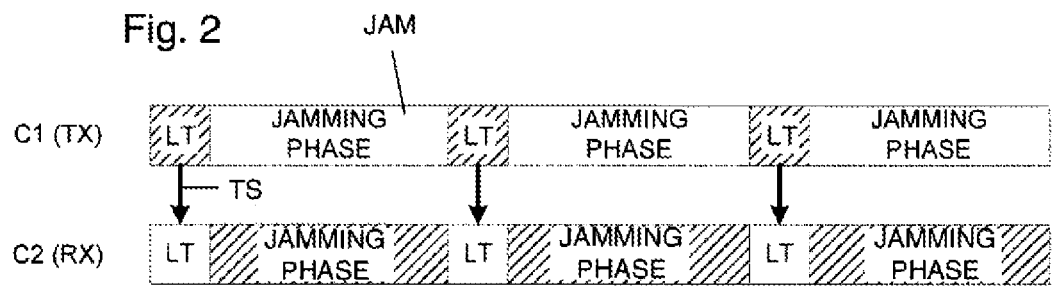
FIG. 2 shows the illustration of the process of the test method according to the invention during normal operation of the radio interferer.

The process of the self-test according to the invention is illustrated in FIG. 2, wherein the self-testing takes place during the normal operation of the radio interferer. Furthermore, the change between interference phases JAM and observation phases LT is also illustrated in FIG. 1.

Figure 3:
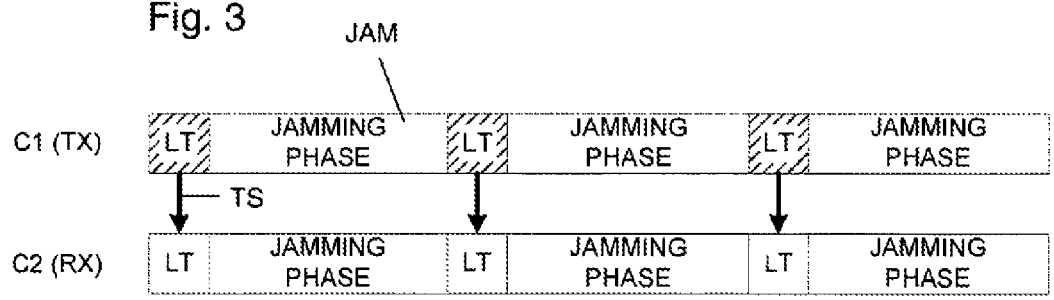
FIG. 3 shows the illustration of the process of the test method according to the invention at system start.

In general a signal is transmitted in the hashed phases LT or JAM of the relevant transmission/reception path in FIG. 2 and FIG. 3.

According to the invention, one of the transmission/reception paths present in the system (in FIG. 1 the transmission/reception path C1) is controlled such that in the observation phase LT, instead of the reception of the signal spectrum, a test signal TS is transmitted, which is received and processed by the receivers of the other transmission/reception paths of the system (C2 is shown as representative of one or more transmission/reception paths receiving the test signal). The transmission/reception paths C2 receiving the test signal TS transmit further interference signals in the interference phase JAM, wherein the received test signal is not taken into account. The transmission/reception path C1 transmitting the test signal remains inactive in the interference phase JAM. With the exception of the test signal transmitting transmission/reception path C1, all transmission/reception paths C2 operate in normal mode and thus ensure the protective action of the system.

The more transmission/reception paths a system has, the smaller is the limitation on the protective effect achievable during the continuous operation of the self-test function described in FIG. 2.

FIG. 3 shows the self-test method according to the invention used at system start.

There is no change regarding the function of C1 compared to the method according to FIG. 2. The test signal is transmitted during the observation phase LT, while there is no transmission during the interference phase. The other channels C2 that receive the test signal analyze the same for the test. Transmission is not carried out during the interference phases JAM in this embodiment.

The spectral pattern of the test signal TS frequency and amplitudes is advantageously adapted to current system and environmental parameters. This enables different system configurations of the interference transmitter and current HF spectrum occupancy in the surroundings of the system to be taken into account.

The system configurations can especially differ by the arrangement of the antennas, the design of the power amplifier and in general also by the cable lengths for connecting the antennas. By adapting the amplitude, under the given system and environmental conditions in each case optimal reception levels can be produced at the transmitter. The control of the spectral pattern in the frequency is advantageously used in order to inhibit the influences of HF spectrum occupancy in the surroundings of the system on the self-testing, wherein complex waveforms can also be used with a plurality of individual carriers and different modulations.

In practical system design it is often required to restrict the number of antennas required for an interference system to a minimum. Thus, the receiving and transmitting antennas of a transmission/reception path can be combined by using suitable changeover switches or circulators. Moreover, it is also possible for a plurality of transmission/reception paths operating in an adjacent frequency range to only use one common antenna. The method according to the invention can also be used for such arrangements.

The use of a common transmitting/receiving antenna for one or even a plurality of transmission/reception paths basically has no influence here on the control of the self-test operation. In the case of a common transmitting/receiving antenna for multiple transmission/reception paths, however, none of these should be used to transmit the test signal, because otherwise the respective other transmission/reception paths would be blocked for operation in normal interference mode and parallel performance of the test operation in addition to the regular interference operation would be restricted.

Particularly advantageously, the spectral pattern of the test signal is produced such that only the harmonic frequencies of the transmission/reception path producing the test signal are used in order to avoid saturation effects on the receiving transmission/reception path. If e.g. the function of the system is tested for a certain frequency f1, then direct transmission of the frequency f1 via the power amplifier could cause destruction of the input stage of the receiver. Therefore the frequency to be tested is advantageously not generated directly, but a frequency f2 is used that produces a suitable harmonic of the frequency f1 after the power amplifier, e.g. for the $4^{th}$ order $f1=5*f2$. The harmonic is then at a significantly lower power level below the directly generated signal frequency and can be used for self-testing without fear of destroying the receiver.

In order to prevent saturation effects on the receiving transmission/reception path, the blanking function normally available at the power amplifier of the transmitting transmission/reception path can advantageously be activated during the generation of the test signal. Specifically, when transmitting the frequency f1 to be tested, the power amplifier is not switched through as during normal operation of the amplifier but rather the blanking signal is switched on and thus high damping is achieved for the transmission of the signal applied to the input of the power amplifier with frequency f1. The signal with frequency f1 is thus limited in the transmission to a level that protects the receiver against destruction or saturation.

Figure 4:
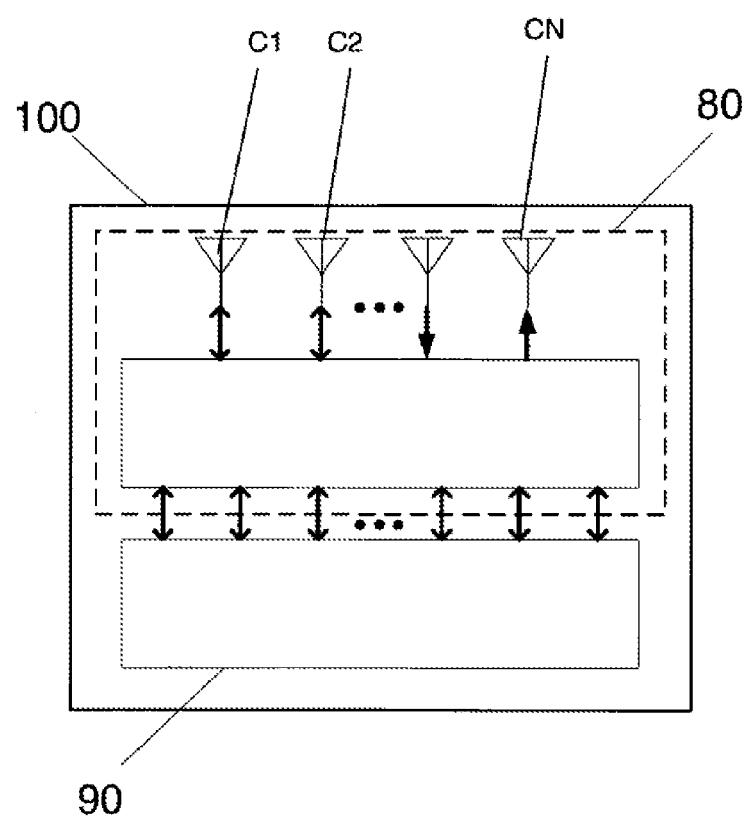
FIG. 4 shows the illustration of the system structure of a reactive radio interferer according to the invention.

Because the method according to the invention can be implemented essentially by only a change of the software configuration without changes in the hardware, modular system designs can thus also be implemented. FIG. 4 shows an example of this. The overall system 100 of the radio interferer is divided into a configuration-independent core component 90 and a configuration-specific component 80 (reference number 10 characterizes e.g. the individual transmission/reception paths C1, C2, . . . CN as part of the configuration-specific component 80 in this schematic illustration), wherein the method according to the invention is implemented in the configuration-independent component 90. This thus enables different configurations of the radio interferer to be tested and their function to be monitored with the same core component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the self-testing of a reactive radio interferer comprising a plurality of time-synchronized transmission/reception paths, the method comprising:
   alternately running each of the plurality of time-synchronized transmission/reception paths through an observation phase for reception of radio spectrum and an interference phase for the transmission of an interference signal based on the radio spectrum received in the observation phase;
   transmitting, by a first one of the time-synchronized transmission/reception paths, a plurality of test signals within said alternately running observation phases;
   receiving, by a second one of the plurality of time-synchronized transmission/reception paths, the plurality of transmitted test signals; and
   analyzing, by the second one of the plurality of time-synchronized transmission/reception paths, the plurality of received test signals.

2. The method of claim 1, wherein the method is performed at a start-up of the reactive radio interferer, and wherein the second one of the plurality of transmission/reception paths does not transmit an interference signal in the interference phase.

3. The method of claim 1, wherein the plurality of time-synchronized transmission/reception paths comprise common transmitting and receiving antennas.

4. The method of claim 1, wherein a spectral pattern of frequency and amplitudes of the plurality of transmitted test signals is adapted to current system and environmental parameters.

5. The method of claim 1, wherein a spectral pattern of the plurality of transmitted test signals is produced such that only harmonic frequencies of the first one of the plurality of time-synchronized transmitting/receiving paths are used, which avoids saturation effects on the second one of the plurality of time-synchronized transmission/reception paths.

6. The method of claim 1, wherein during generation of the plurality of transmitted test signals a blanking function of a power amplifier in the first one of the plurality of time-synchronized transmission/reception paths is activated in order to prevent saturation effects on the second one of the plurality of time-synchronized transmission/reception paths.

* * * * *